United States Patent
Marvin, Jr. et al.

(10) Patent No.: US 7,483,269 B1
(45) Date of Patent: Jan. 27, 2009

(54) TEST RACK ADAPTER FOR HARD DISK DRIVE

(75) Inventors: William M. Marvin, Jr., Loveland, CO (US); David S. McMurtrey, Loveland, CO (US); Richard D. LeSage, Longmont, CO (US)

(73) Assignee: Maxtor Corporation, Scotts Valley, CA (US)

( * ) Notice: Subject to any disclaimer, the term of this patent is extended or adjusted under 35 U.S.C. 154(b) by 114 days.

(21) Appl. No.: 11/542,607

(22) Filed: Oct. 2, 2006
(Under 37 CFR 1.47)

Related U.S. Application Data

(60) Provisional application No. 60/722,831, filed on Sep. 30, 2005.

(51) Int. Cl.
*G06F 1/16* (2006.01)
(52) U.S. Cl. .................................... 361/685
(58) Field of Classification Search ................ 361/700, 361/685; 360/97.01; 369/100
See application file for complete search history.

(56) References Cited

U.S. PATENT DOCUMENTS

| | | | |
|---|---|---|---|
| 5,195,022 A * | 3/1993 | Hoppal et al. | 361/685 |
| 5,579,204 A * | 11/1996 | Nelson et al. | 361/685 |
| 5,851,143 A | 12/1998 | Hamid | |
| 6,124,707 A | 9/2000 | Kim et al. | |
| 6,178,835 B1 | 1/2001 | Orriss et al. | |
| 6,327,150 B1 | 12/2001 | Levy et al. | |
| 6,385,739 B1 | 5/2002 | Barton et al. | |
| 6,473,301 B1 | 10/2002 | Levy et al. | |
| 6,643,798 B2 | 11/2003 | Barton et al. | |
| 6,785,133 B2 * | 8/2004 | Barringer et al. | 361/694 |
| 6,826,046 B1 | 11/2004 | Muncaster et al. | |
| 6,862,173 B1 * | 3/2005 | Konshak et al. | 361/685 |
| 7,054,150 B2 | 5/2006 | Orriss et al. | |
| 7,068,500 B1 * | 6/2006 | Beinor et al. | 361/685 |
| 7,088,541 B2 | 8/2006 | Orriss et al. | |
| 7,164,579 B2 | 1/2007 | Muncaster et al. | |
| 7,203,060 B2 | 4/2007 | Kay et al. | |

* cited by examiner

*Primary Examiner*—Michael C Zarroli
(74) *Attorney, Agent, or Firm*—Leanne Taveggia Farrell; Westman, Champlin & Kelly, P.A.

(57) ABSTRACT

An adapter which allows two or more hard disk drives to conduct self-testing in a single test rack slot is provided. Testing can be individually controlled for the various HDDs in a slot. Peltier cell devices or other cooling or heating devices can be controlled to achieve individualized temperature control for HDDs in the test rack slot.

19 Claims, 4 Drawing Sheets

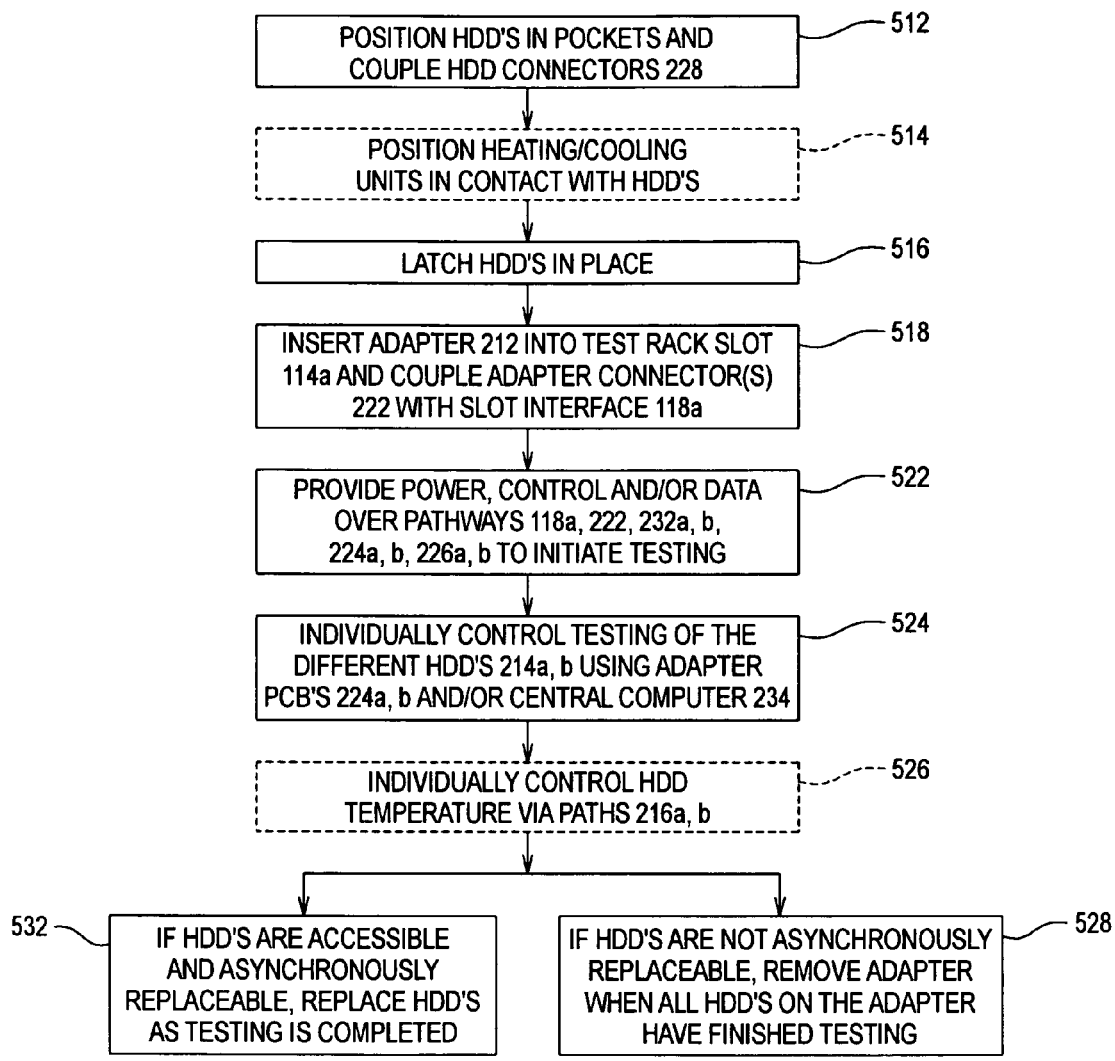

TEST RACK ADAPTER FOR HARD DISK DRIVE

CROSS-REFERENCE TO RELATED APPLICATIONS

Priority is claimed from U.S. Provisional Application Ser. No. 60/722,831 filed Sep. 30, 2005, which is incorporated herein by reference.

FIELD OF THE INVENTION

The present invention is directed to an apparatus, system and method which adapts a hard disk drive (HDD) test rack, configured to normally accommodate, in each of a plurality of slots, at least a first size or style of HDD, such that, following adaptation, one or more of the single-drive slots of the test rack can accommodate two or more HDDs, and preferably provides at least partially-individualized test control and/or data collection.

BACKGROUND INFORMATION

Many HDD production facilities and procedures involve performing one or more tests on HDDs, often following, or as part of, the servo track writing (STW) procedure. Such tests can be used for one or more of a number of purposes, including detecting flaws or anomalies, preferably, while obtaining information about the severity and/or location of the flaws or anomalies, obtaining disk characterization information (such as characterization of disk runout, fly height, read/write head operating characteristics) and the like. The results of such testing can be used for any of a number of purposes. Such testing can be used as a basis for deciding whether to fail an anomalous drive (take it out of the production stream, e.g., for repair, rebuild, scrap or the like). Testing can be used to obtain statistical information for process control, such as identifying suboptimal procedures or equipment. Testing can be used for obtaining and storing information, typically on the HDD, for use in normal read/write operation (such as sector remap information, runout correction information, fly height adjustment information and the like).

In many situations, some or all of the procedures used during such testing are specified in programming stored on the HDD. Thus, such tests are often called "self-test," although, generally, at least some control (such as selecting the timing, order and/or number of tests to be performed), along with power for the HDD, is provided from external circuitry.

In many, if not most, self-test situations, at least some self-tests are performed before the HDD is sealed, and/or are otherwise performed in circumstances where it is advisable that the self-tests be conducted in a controlled environment. Typically, there are a number of HDDs undergoing self-tests, at any one time in such an environment. Typically, there are a number of HDDs undergoing self-tests, at any one time in such an environment, typically while each HDD is positioned in a slot of a "test rack," where each slot not only supports an HDD but also provides power and, in some cases, control signals to the HDD. If viewed on an (average) per-HDD, which can be of significance to the final production cost of the product, particularly when test rack space is positioned in the (relatively expensive, per square foot) controlled environment. Accordingly, it would be useful to provide an apparatus, system and method which can effectively decrease the per HDD capital cost associated with test track slot space.

The production costs associated with test rack use is also related to the length of time, allocatable to individual HDDs, spent in the test rack, as needed to perform the self-testing. Accordingly, it would be useful to provide an apparatus, system and method which can reduce the average length of time, allocated to each HDD, spent in the test rack.

Some HDD testing involves performing tests while the HDD is at certain specified temperatures, or within specified temperature ranges. Some test protocols involve cooling to temperatures below ambient and/or heating to temperatures above ambient. Many previous systems involve changing the temperature of the entire clean room or other test rack area, leading to testing inefficiencies, e.g., when not all HDDs need to be tested at the same temperature for the same periods of time. Even if the temperatures within individual test rack slots were independently controlled, there is a potential for inefficiency if temperature control with a granularity smaller than test rack slots is useful. Accordingly, it would be useful to provide apparatuses, systems and methods which can reliably provide two (or more) different temperatures within a single test rack slot.

SUMMARY OF THE INVENTION

The present invention includes an appreciation and/or recognition of the existence, nature and/or source problems in previous approaches including those described herein.

In general, hard disk drive test racks have slots which are configured to accommodate a particular size, shape and/or form factor of HDD. Many previous ("legacy") test racks have slots configured to accommodate the common 3½ inch HDD form factor. Thus, it is not surprising that previous test rack slots typically had a single ("native") electrical interface (e.g., for providing power and/or data or control signals to the HDD) for each slot, which was typically configured and positioned to couple with corresponding power or signal connectors on the HDD. Those skilled in the art will understand the various styles of power, signal and data interfaces and connectors typically used with previous HDDs. Thus, it is possible to define the "slot" of previous racks either as the space configured to accommodate a single HDD of a given form factor or as the space served by a single electrical interface.

According to one embodiment of the invention, an adapter is provided which allows two or more hard disk drives to simultaneously undergo testing or self-testing procedures while coupled to an adapter which is positioned at least partially within (and/or coupled to) a single test rack slot and/or while receiving power, data or control via a single test rack slot interface. Typically, the HDDs will have a form factor smaller than the form factor for which the test rack slot was designed, such as accommodating two, or more preferably four, or even more preferably six, eight or more, one-inch form factor HDDs in a test rack slot originally designed to accommodate a single 3½ inch HDD.

Preferably, the adapter is configured to provide at least some degree of individualization of testing such as providing the ability to send different power or control or data signals to, or receive data from, two or more different HDDs in the same test rack slot. The power, control or data sent to or obtained from one of the HDDs in (or coupled to) the slot is typically different, in content and/or timing, from the power, data or control signals sent to or received from at least one other of the HDDs in (or coupled to) the same test rack slot.

According to some facets of the invention, the adapter includes one or more electrical circuits, circuit components or circuit boards connected directly or indirectly to the native test rack interface and also connected, directly or indirectly, to two or more HDDs in a single test rack slot. In one embodiment of the invention, the adapter includes, or can be coupled to, HDD-specific cooling or heating devices which can provide two different temperatures for at least first and second HDDs positioned in, or coupled to, a single test rack slot. In one embodiment, the HDD-specific temperature control device includes one or more peltier cells.

In one embodiment, an adapter which allows two or more hard disk drives to conduct self-testing in a single test rack slot is provided. Testing can be individually controlled for the various HDDs in a slot. Peltier cell devices or other cooling or heating devices can be controlled to achieve individualized temperature control for HDDs in the test rack slot.

DETAILED DESCRIPTION OF THE PREFERRED EMBODIMENTS

Figure 1:
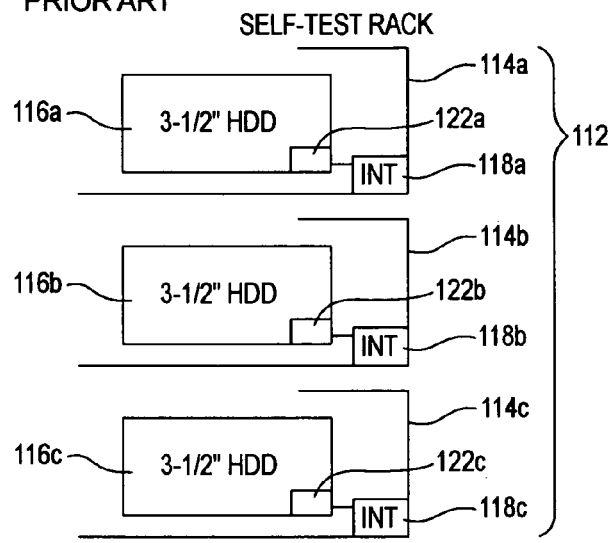
FIG. 1 is a diagrammatic block diagram of a portion of a previous test rack, with HDDs in slots thereof.

A typical previous test rack is a rectangular array of rectangularly-shaped slots, each slot having an electrical interface. Those skilled in the art will understand the actual shape and construction of previous test racks. FIG. 1 is not intended to show the actual details of construction of a test rack, but to provide an indication of the relationship of certain components of test racks and HDDs contained therein.

As illustrated in FIG. 1, in previous devices and approaches, a self-test rack 112 had a plurality of slots 114A, B, C. Each slot 114A, B, C is sized and shaped to accommodate or receive a single HDD of a particular form factor such as an HDD with a 3½ inch form factor 116A, B, C. Each slot 114A, B, C has an electrical interface 118A, B, C, which may be connected to power, control signal or data sources (not shown). Each interface 118A, B, C includes components for coupling to corresponding power, control signal and/or data connectors 122A, B, C of the drives 116A, B, C when the drives 116A, B, C are in the respective slots 114A, B, C.

Figure 2:
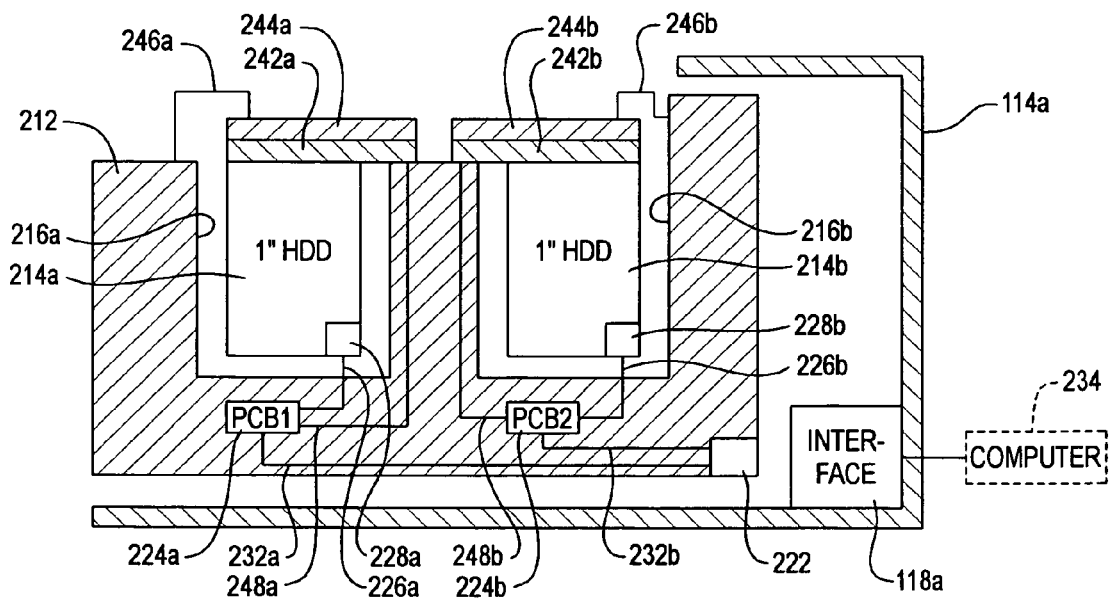
FIG. 2 is a block diagram of a test rack, adapter and HDDs therein according to an embodiment of the present invention.

In the configuration of FIG. 2, the test rack slot 114A (at least partially) receives an adapter 212 which holds at least first and second HDDs 214A, B, e.g., in pockets 216A, B. In the illustration of FIG. 2, the HDDs 214A, B are of a smaller form factor than the HDDs 116A, B, C which are accommodated by the slots 114A, B, C in the previous approach (FIG. 1). For example, the HDDs 214A can be one-inch form factor HDDs. Those skilled in the art will understand the sizes and shapes associated with 3½ inch form factor HDDs, one inch form factor HDDs and HDDs of other form factors.

The adapter 212 includes a coupler 222. Although a number of couplers could be used, preferably coupler 222 has a size, position and configuration substantially similar to the size, position and configuration of the couplers 122A, B, C of the previous HDDs as shown in FIG. 1 and, in any case are sized, shaped and configured to at least partially couple with the interface 118A, in order to provide a part of the pathway for power, control and/or data signals, e.g., as described herein.

In the configuration of FIG. 2, first and second printed circuit boards 224A, B have one or more output lines each 226A, B to complete the power, control and/or signal paths to the HDDs 214A, B, preferably using the HDD's native couplers 228A, B. The PCBs 224A, B receive and/or send data and receive power or control signals via one or more lines 232A, 232B connecting them to the coupler 222.

Although it is possible to provide adapters 212 in which the PCBs are substantially passive (e.g. providing only for amplification, conditioning and/or routing of signals, e.g., from a central computer or other controller optionally connected to the interface), preferably, the PCBs 224A, B have a more active role such as storing data collected from the HDDs during the test, (fully or partially) selecting which tests to perform and/or when to initiate particular tests, e.g., based on results or data received from the HDDs 214A, B, and the like. In either case, whether testing is controlled by the PCBs 224A, B, from a central computer 234 or by a combination thereof, the system preferably provides for individualization of testing so that it is possible that, at a given time, two HDDs 214A, B in the same slot 114A can be performing different tests and/or can have the same test initiated at different times.

Providing the capacity for individualization of testing for two or more HDDs in the same test rack slot can be useful for a number of reasons. According to some testing protocols, the type or duration of test or tests which are performed may vary, e.g., depending on results from previous tests. For example, if a first test indicates a first type of anomaly, the protocol may involve performing additional tests to further characterize the anomaly (such as determining its location, severity and type), whereas if the first type of anomaly is not found, such further testing may not be performed. If the adapter 212 were configured such that all tests within a test slot had to be performed in lock step, then an anomaly of type one in the first HDD 214A in a given slot would mean that a second HDD 214B in the same slot would either have to also undergo the further tests, unnecessarily, or would have to remain idle, during the time the further tests were performed on the first HDD 214A. Individualization would allow the second HDD 214B to proceed on to the next test in the test series while the first HDD 214A was still performing the follow-up test to characterize the anomaly. It is, of course, possible the situation could thereafter be reversed with the protocol requiring additional test duration for the second HDD 214B which is not required in the first HDD 214A. In this way, individualization of testing has the potential to, not only permit some HDDs in a slot to complete their testing before others, but to reduce the total amount of time the group of HDDs remain in a particular slot for testing. If asynchronous loading and unloading of HDDs is available, it would not be necessary for the entire group of HDDs to remain in the slot for the same time period. Rather, in the case of asynchronous loading and unloading, the present invention offers the opportunity to replace any HDD in a slot as soon as testing of that HDD is complete. This advantage is further pronounced when the adapter 212 is configured to accommodate three or more HDDs.

In the configuration depicted in FIG. 2, the adapter 212 also provides for individualization of temperature control for the first and second HDDs 214A, B. In the embodiment shown in FIG. 2, peltier cells 242A,B and adjacent finned heat sinks 244A, B are held in close contact e.g. by latches 246A, B. A peltier cell is a substantially solid state cooling/heating device which, when supplied with electrical energy, experiences a temperature drop on one surface and a temperature rise on the opposite surface. Peltier cells are believed to be particularly useful in retrofit situations and in situations where multiple drives are positioned in a single slot space, since cooling can be achieved so as to provide temperature individualization without the need to supply tubing or conduits for conducting air, water or other fluids in potentially small spaces.

Preferably, the heating/cooling of the HDDs 214A, B is individualized such that the first HDD 214A can be undergoing testing at a first temperature while the second HDD 214B is undergoing testing at a second, different temperature. In the depicted embodiment, the first and second PCBs 224A, B are connected by output lines 248A, B to the peltier cells 242A, B, e.g., to provide power and/or control signals thereto.

Figure 3:
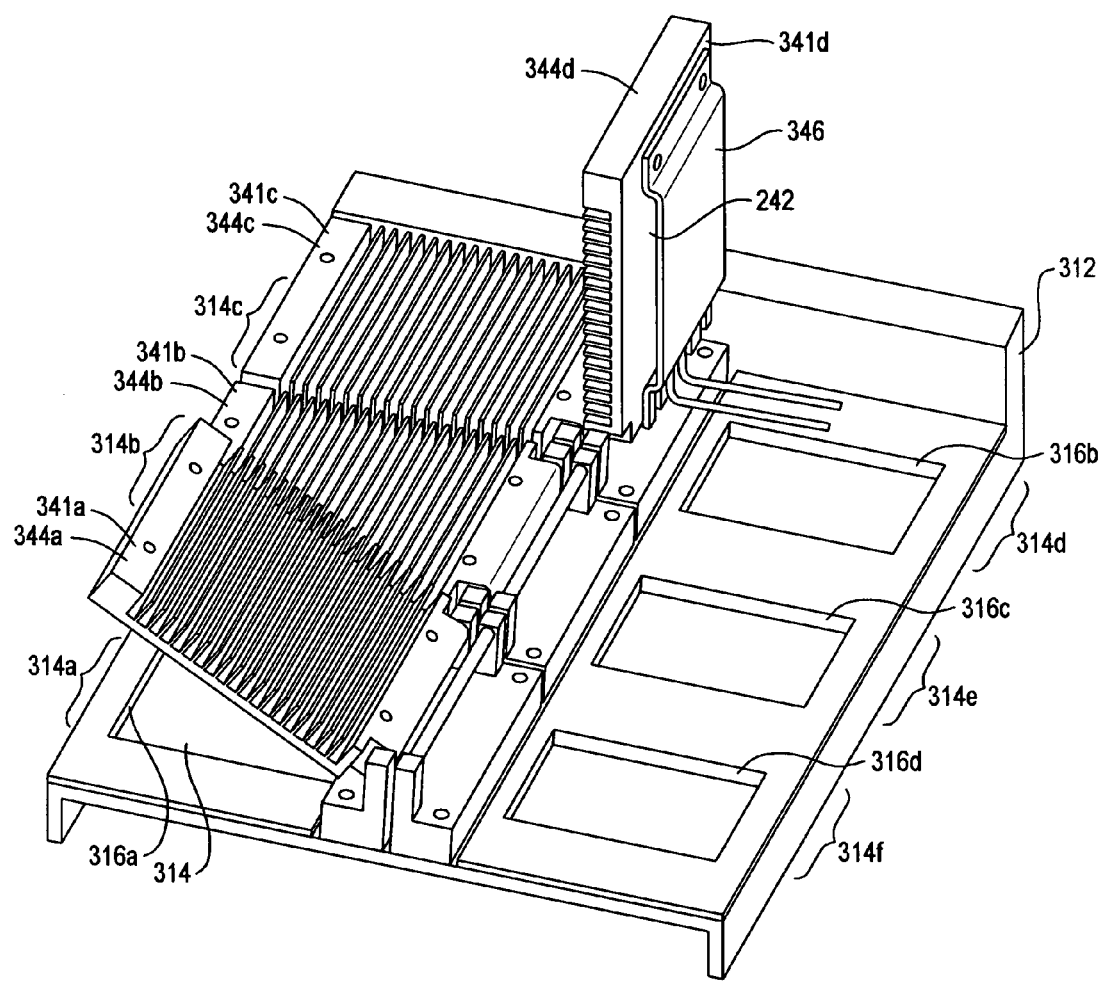
FIG. 3 is a perspective view of an adapter according to an embodiment of the present invention.

FIG. 3 shows a partially disassembled adapter 312 according to an embodiment of the present invention. The adapter of FIG. 3 has six regions 314A-314F with each region configured to accommodate a 1 inch form factor hard disk drive.

In the view of FIG. 3, four of the pockets 316A, B, C, D for receiving or holding disk drives are visible and pocket 316A has a disk drive 314 positioned therein. Four heating/cooling units are depicted. Heating/cooling units which can be positioned to cover pockets 314E and 314F are removed in the view of FIG. 3, for clarity. Each heating/cooling unit is hinged to permit movement between an upright position 341D, e.g. to facilitate loading/unloading of the HDDs, through an intermediate position 341A to closed positions 341B, 341C substantially covering the HDDs 314 in the pockets 316A-D.

In the configuration of FIG. 3, a peltier cell 242 is provided in each heating/cooling unit 341A-D positioned between a thermally conductive contact plate 346 and a finned heat sink 344A-D. Preferably, the heating/cooling devices 341A-D can be latched or otherwise secured to position the thermally conductive plate 346 in intimate contact with the upper surface of disk drives 314 positioned in the pockets 316. Any of a number of latching, fastening or securing devices can be used for this purpose, as will be apparent to those skilled in the art after understanding the present disclosure. Although the view of FIG. 3 does not show the coupler 222, printed circuit boards 224, lines 232A, B, 248A, B, PCBs 224A, B, couplers 228A, B, output lines 226A, B and the like, those skilled in the art will understand how to design, fabricate, select and/or configure these or similar items at least after understanding the present disclosure.

Figure 4:
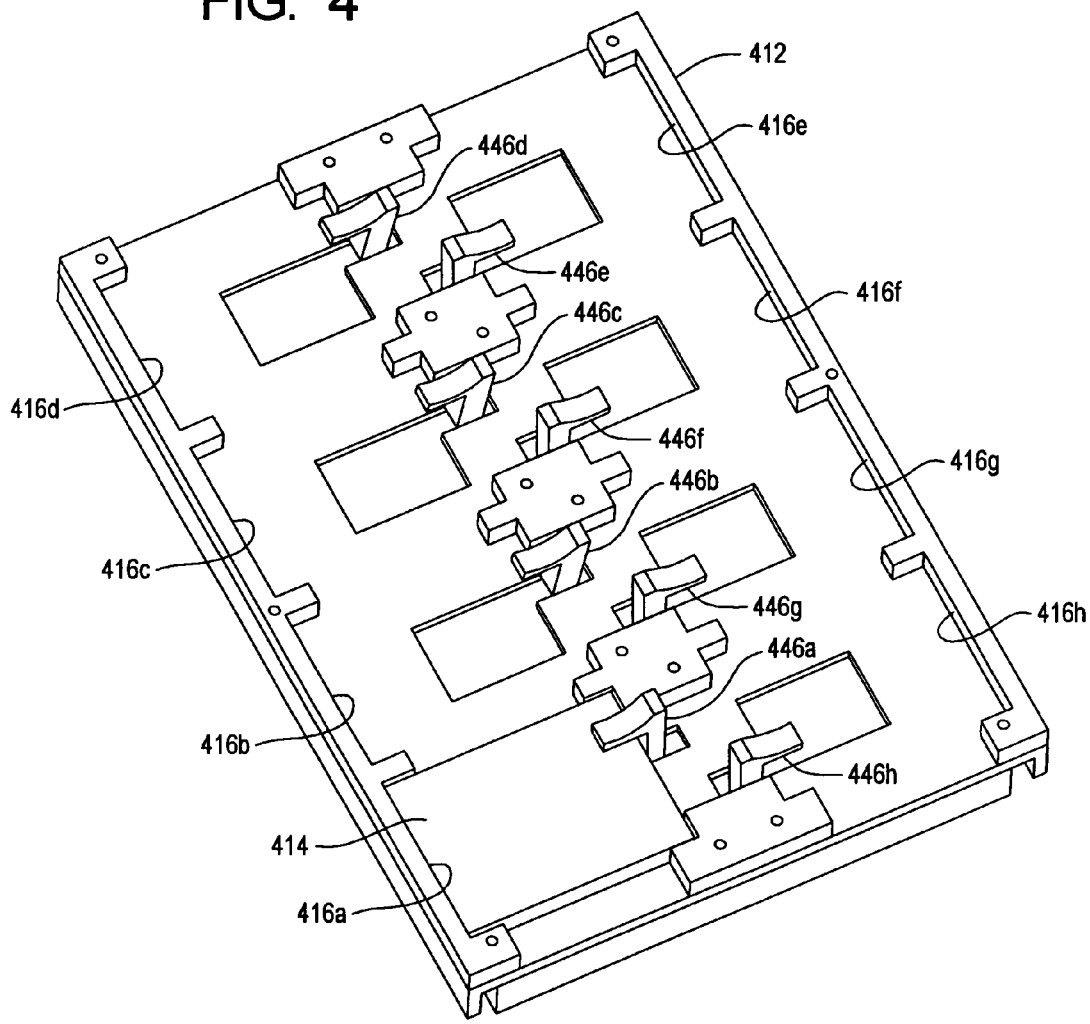
FIG. 4 is a perspective view of an adapter according to an embodiment of the present invention; and, FIG. 5 is a flowchart of a procedure according to an embodiment of the present invention.

FIG. 4 depicts another configuration of an adapter according to an embodiment of the present invention 412. The adapter depicted in FIG. 4 does not contain hinged heating/cooling units. The adapter of FIG. 4 provides eight pockets 416A-416H each configured to receive a one inch form factor hard disk drive, one of which 414 is shown in FIG. 4. Resilient clips 446A-H are configured and positioned to secure the disk drives 414 within the pockets 416A-H. The particular configuration of couplers 222, 228A, B, PCBs 224A, B and the like will depend upon the configuration and model of the HDD 414 and those skilled in the art will understand how to design, fabricate, select and/or configure the items to use appropriately with various HDDs 414.

Furthermore, those skilled in the art will understand how to design, fabricate, configure and/or select the various devices noted herein including the printed circuit boards, peltier cells, heat sinks, latches, couplers and the like, at least after understanding the present disclosure.

In use, as depicted in FIG. 5, testing will begin with positioning the HDDs in the various pockets of the adapter and coupling 512 the HDD connectors 228. If the adapter is equipped with heating/cooling units, the heating/cooling units are positioned in contact with the HDDs 514. The HDDs are latched in place 516, the adapter 212 is inserted in the test rack slot 114A, and the adapter connectors 222 are coupled 518 with the slot interface 118A. This system provides power, control and/or data to or from the HDDs over pathways 118A, 222, 232A, B, 224A, B, 226A, B so as to initiate testing in the HDDs 522.

Testing in the different HDDs 214A, B is individually controlled 524 using the adapter PCBs 224A, B and/or a central computer 234. If heating/cooling is provided, preferably the HDD temperatures are individually controlled 526 via paths 248A, B.

It is anticipated that many test rack and adapter systems will not provide for asynchronous loading of HDDs or otherwise provide for loading of HDDs into or out of adapters while the adapters are in the test rack slots. Accordingly, it is believed that in most configurations, the adapter will be removed after all the HDDs on the adapter have finished their testing 528. However, if systems are configured to permit asynchronous loading or unloading of HDDs in the adapter (and assuming the HDDs are accessible while in the test rack slots), HDDs can be replaced as the testing on each HDD is completed 532.

A number of variations and modifications of the present invention can be used. Although embodiments have been described in which a separate PCB is provided for sending and/or receiving power, control or data signals to or from each HDD, it is possible to provide configurations in which a single PCB includes circuitry used for controlling or receiving signals from two or more HDDs or in which two or more PCBs are provided for each HDD. A number of circuitry components or other devices can be used in this connection, especially, active PCBs including devices which perform logic operations such as programmed microprocessors or microcontrollers, programmed gate arrays, application specific integrated circuits and the like.

Although peltier cells have been discussed for providing heating or cooling when two or more HDDs are positioned in a single test rack slot, it is possible to use peltier cells for heating or cooling when only a single HDD is in a test rack slot (with or without an adapter).

Although embodiments have been depicted in which a single HDD test rack slot holds an adapter which accommodates two, six or eight HDDs, some or all aspects of the present invention can be used in connection with adapters which hold other numbers of HDDs, including adapters which may extend outward from the test rack slots, e.g., to hold additional HDDs.

Although the present invention has been described in the context of test racks used for holding HDDs during self-testing or other testing, it is possible to use some or all features of the present invention in the context of racks used during other operations, such as servo writing, track circularization, drive characterization, drive read/write use, and the like and/or for rack operations of devices other than HDDs including, e.g., optical disks or optical disk drives and the like.

Although procedures have been described in connection with the present invention, it is possible to implement embodiments of the present invention using other procedures, including procedures having more or fewer steps and/or procedures in which steps are performed in an order different from that depicted or described.

Although an adapter according to embodiments in the present invention has been described as a device, holding multiple HDDs, which is routinely inserted into, and removed from, a test rack slot, it is also possible to configure adapters which are not routinely removed from the test rack, but remain substantially permanently in place while the HDDs are inserted into or removed from the adapters.

Although embodiments of the present invention have been described as being useful in reducing or avoiding certain capital costs of hard disk drive manufacturing by providing apparatus, systems and methods which effectively retrofit existing or "legacy" test racks to efficiently and effectively accommodate newer and/or smaller form factor drives, preferably, with more than one drive per legacy rack slot, it is possible to use some or all features of the invention in a context other than retrofit, e.g., in connection with newly-constructed or acquired test racks.

Although embodiments of the present invention have been described which use peltier cells for temperature control, other temperature control systems can be used (instead of, or in addition to peltier cells) including circulating air, water or other fluid, radiative heating, convective cooling, and the like.

In light of the above description, a number of advantages of the present invention can be seen. The present invention can effectively increase the drive density in self-test racks. The present invention allows self-testing or other testing of HDDs while avoiding capital costs associated with replacing old (legacy) form-factor test racks or otherwise avoiding the need to acquire entire new test rack facilities. The present invention can reduce the capital costs attributable to individual HDDs associated with test procedures. The present invention can shorten the average per-HDD time required for self-testing or other testing. The present invention can provide for individualized control of multiple HDDs in a single test rack slot. The present invention can provide for individualized temperature control of multiple HDDs in a single test rack slot. The present invention can provide for HDD temperature control without the need for providing conduits to conduct air, water or other fluid.

The present invention, in various embodiments, includes components, methods, processes, systems and/or apparatuses substantially similar to those depicted and described herein, including various embodiments, sub-combinations, and subsets thereof. Those skilled in the art will understand how to make and use the present invention after understanding the present disclosure. The present invention, and various embodiments, includes providing the devices and processes in the absence of items not depicted and/or described herein or in various embodiments hereof, including in the absence of such items as may have been used in previous devices or processes, e.g., for improving performance, achieving ease of implementation and/or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the forms or form disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An adapter for use in connection with a data storage device test rack, the adapter comprising:
    a base member configured to fit into one of a plurality of slots in a data storage device test rack while holding a plurality of first data storage devices, each of the plurality of first data storage devices defining a first form factor, each slot of the data storage device rack configured, otherwise without the base member, to operably accommodate a second data storage device defining a second form factor and each slot including an electrical interface, wherein a size of each first data storage device is less than a size of the second data storage device; and
    electrical components providing a pathway for at least one of power signals, data signals and control signals from the electrical interface to each of the first plurality of data storage devices defining the first form factor.

2. The adapter as claimed in claim 1, wherein said electrical components comprise connectors configured to mate with one or more connectors in said electrical interface.

3. The adapter as claimed in claim 1, wherein said electrical components comprise circuitry which, at least partially, separately controls testing of each of said plurality of first data storage devices that define the first form factor.

4. The adapter as claimed in claim 1, wherein said electrical components comprise circuitry which separately collects data for each of the plurality of first data storage devices that define the first form factor, the data being indicative of at least a test.

5. The adapter as claimed in claim 1, further comprising at least first and second individually controllable temperature regulating devices which heat and cool at least first and second of said plurality of first data storage devices that define the first form factor, respectively.

6. The adapter as claimed in claim 5, wherein each of said temperature regulating devices comprises a peltier cell.

7. The adapter as claimed in claim 5, wherein each temperature regulating device is movable between a first position that is in sufficient proximity to one of the plurality of first data storage devices that define the first form factor to provide heating and cooling and a second position that provides removable access to one of the plurality of first data storage devices.

8. A test rack comprising:
    a plurality of slots each sized and shaped to operably accommodate a first data storage device defining a first form factor, each slot including an electrical interface;
    a plurality of adapters each sized to hold a plurality of second data storage devices, each of the plurality of second data storage devices defining a second form factor, each adapter configured for insertion into anyone of the plurality of slots and comprising:
        a base member having a plurality of pockets, each pocket configured to receive one of the plurality of second data storage devices; and
        a plurality of electrical components providing a pathway for at least one of power signals, data signal and control signals, each electrical component couples each of the plurality of second data storage devices to the electrical interface of the slot.

9. The test rack as claimed in claim 8, wherein a size of the plurality of second data storage devices that define the second form factor is less than a size of the first data storage device defining the first form factor.

10. The test rack as claimed in claim 8, wherein the plurality of electrical components of each adapter further comprise:
    a plurality of connectors configured to mate with one or more connectors in the electrical interface.

11. The test rack as claimed in claim 10, wherein the plurality of electrical connectors of each adapter further comprise:

circuitry to separately control testing of each of the plurality of second data storage devices.

12. The test rack as claimed in claim 10, wherein the plurality of electrical connectors of each adapter further comprise:

circuitry for separately collecting data indicative of at least some of the testing of the plurality of second data storage devices.

13. The test rack as claimed in claim 8, further comprising:

a temperature regulating device for each of the plurality of second data storage devices, each temperature regulating device configured to one of cool and heat one of the plurality of second data storage devices.

14. The test rack as claimed in claim 13, wherein the temperature regulating devices comprise peltier cells.

15. The test rack as claimed in claim 14, wherein each peltier cell is configured to move between a first position that is in sufficient proximity to one of heat and cool each of the plurality of second data storage devices and a second position providing to allow removable access to each of the plurality of second data storage devices.

16. A data storage device test rack comprising:

a plurality of slots, each slot sized and shaped to accommodate a first data storage device defining a first form factor, each slot having an electrical interface;

means for holding a plurality of second data storage devices, each of the plurality of second data storage devices defining a second form factor, said means for holding configured to fit into anyone of the plurality of slots of said data storage device test rack; and means for providing at least one of power signals, data signals and control signals from said electrical interface to each of said plurality of second data storage devices.

17. The apparatus as claimed in claim 16, wherein said means for providing includes means for separately controlling testing for each of the plurality of second data storage devices.

18. The apparatus as claimed in claim 16, wherein said means for providing includes means for separately collecting data indicative of testing for each of the plurality of second data storage devices.

19. The apparatus as claimed in claim 16, further comprising means for changing a temperature of each of the plurality of second data storage devices.

* * * * *